United States Patent
Takahashi et al.

(10) Patent No.: US 9,500,156 B2
(45) Date of Patent: Nov. 22, 2016

(54) REMOTE CONTROL DEVICE FOR VEHICLE

(75) Inventors: Kazuma Takahashi, Kamakura (JP); Takayuki Iwasaki, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 348 days.

(21) Appl. No.: 14/118,779

(22) PCT Filed: Feb. 24, 2012

(86) PCT No.: PCT/JP2012/054531
§ 371 (c)(1),
(2), (4) Date: Nov. 19, 2013

(87) PCT Pub. No.: WO2012/160848
PCT Pub. Date: Nov. 29, 2012

(65) Prior Publication Data
US 2014/0095057 A1     Apr. 3, 2014

(30) Foreign Application Priority Data

May 23, 2011   (JP) ................................ 2011-114605

(51) Int. Cl.
*F02D 45/00*     (2006.01)
*F02D 41/04*     (2006.01)
(Continued)

(52) U.S. Cl.
CPC ........... *F02D 45/00* (2013.01); *B60H 1/00657* (2013.01); *B60H 1/00778* (2013.01);
(Continued)

(58) Field of Classification Search
CPC ..................... F02D 45/00; F02D 17/04; F02D 41/042; F02D 2009/0245; F02P 9/005;
(Continued)

(56) References Cited

U.S. PATENT DOCUMENTS 2,931,166 A * 4/1960 King ...................... F01L 13/00
                                                        60/630
5,042,439 A * 8/1991 Tholl ................... F02N 11/0807
                                                        123/179.2
(Continued)

FOREIGN PATENT DOCUMENTS

JP         11-93811 A      4/1999
JP       2001-65368 A      3/2001
(Continued)

OTHER PUBLICATIONS

Supplementary European Search Report dated Feb. 26, 2015, 6 pgs.

*Primary Examiner* — Hieu T Vo
*Assistant Examiner* — Sherman Manley
(74) *Attorney, Agent, or Firm* — Foley & Lardner LLP (57) ABSTRACT

A remote control device for vehicle is capable of remotely controlling the start and stop of an engine mounted in a vehicle. The remote control device for vehicle includes a remote controller for transmitting a start request and a stop request of the engine, and an engine control unit for stopping the engine by stopping fuel supply to the engine in the case of satisfying, in a state where the engine is started upon receiving the start request, at least one of a condition that a predetermined forced OFF time has elapsed and a condition that the stop request has been received.

8 Claims, 10 Drawing Sheets

(51) Int. Cl.

| | |
|---|---|
| *F02N 11/08* | (2006.01) |
| *B60H 1/00* | (2006.01) |
| *F02P 9/00* | (2006.01) |
| *F02D 17/04* | (2006.01) |
| *B60K 28/00* | (2006.01) |
| *F02N 11/10* | (2006.01) |
| *F02P 11/00* | (2006.01) |
| *F02D 9/02* | (2006.01) |

(52) U.S. Cl.
CPC ............. *F02D 17/04* (2013.01); *F02D 41/042* (2013.01); *F02N 11/0807* (2013.01); *F02P 9/005* (2013.01); *B60K 28/00* (2013.01); *F02D 2009/0245* (2013.01); *F02D 2200/604* (2013.01); *F02N 11/0811* (2013.01); *F02N 11/0822* (2013.01); *F02N 11/101* (2013.01); *F02N 2200/022* (2013.01); *F02N 2200/0801* (2013.01); *F02N 2200/0802* (2013.01); *F02N 2200/102* (2013.01); *F02N 2200/106* (2013.01); *F02N 2300/2011* (2013.01); *F02P 11/00* (2013.01)

(58) Field of Classification Search
CPC .................. F02P 11/00; B60H 1/00778; B60H 1/00657; F02N 11/0807; F02N 11/101; F02N 11/0811; F02N 2300/2011; F02N 2200/002; F02N 2200/0802; F02N 2200/102; F02N 2200/106; F02N 2200/801; F02N 2200/604; B60K 28/00
See application file for complete search history.

(56) References Cited

U.S. PATENT DOCUMENTS

| | | | | |
|---|---|---|---|---|
| 5,730,098 | A * | 3/1998 | Sasaki | F02B 77/08 123/198 DB |
| 5,757,086 | A * | 5/1998 | Nagashima | F02N 11/0807 123/179.2 |
| 5,794,580 | A * | 8/1998 | Galletti | F02N 11/0807 123/179.2 |
| 6,404,071 | B1 * | 6/2002 | Kurano | B60R 25/04 114/55.58 |
| 2004/0108728 | A1 * | 6/2004 | Renner | F02D 41/042 290/40 R |
| 2009/0132154 | A1 * | 5/2009 | Fuwa | F01L 13/00 701/112 |
| 2010/0114461 | A1 * | 5/2010 | Gibson | F02D 41/0002 701/112 |

FOREIGN PATENT DOCUMENTS

| | | |
|---|---|---|
| JP | 2002-339781 A | 11/2002 |
| JP | 2011-89467 A | 5/2011 |

* cited by examiner

REMOTE CONTROL DEVICE FOR VEHICLE

TECHNICAL FIELD

The present invention relates to a remote control device for vehicle capable of remotely controlling the start and stop of an engine mounted in a vehicle.

BACKGROUND ART

A remote control starter is known which is capable of remotely controlling the start and stop of an engine mounted in a vehicle by a remote controller. The remote control starter is used, for example, to actuate an air conditioner, which operates in conjunction with the operation of the engine, and set the interior of the vehicle to a comfortable temperature by starting the engine by a remote control before a driver gets into the vehicle.

It is disclosed in JP11-93811A to determine abnormality in an air conditioner and forcibly stop an engine by cutting off an ignition circuit if an operating state of the engine continues for a predetermined time or longer after the engine is started by a remote control starter.

SUMMARY OF INVENTION

However, in the event of a failure which makes it impossible to cut off a power supply of the vehicle in the remote control device disclosed in JP11-93811A, the engine cannot be forcibly stopped since the ignition circuit cannot be cut off.

The present invention aims to provide a remote control device for vehicle capable of forcibly stopping an engine even in the event of a failure which makes it impossible to cut off a power supply of a vehicle.

According to one aspect of the present invention, a remote control device for vehicle capable of remotely controlling the start and stop of an engine mounted in a vehicle is provided. The remote control device for vehicle comprises a remote controller for transmitting a start request and a stop request of the engine and an engine control unit for stopping the engine by stopping fuel supply to the engine in the case of satisfying, in a state where the engine is started upon receiving the start request, at least one of a condition that a predetermined forced OFF time has elapsed and a condition that the stop request has been received.

Embodiments of the present invention and advantages thereof are described in detail below with reference to the accompanying drawings.

DESCRIPTION OF EMBODIMENTS

Hereinafter, an embodiment of the present invention is described in detail with reference to the drawings.

Figure 1:
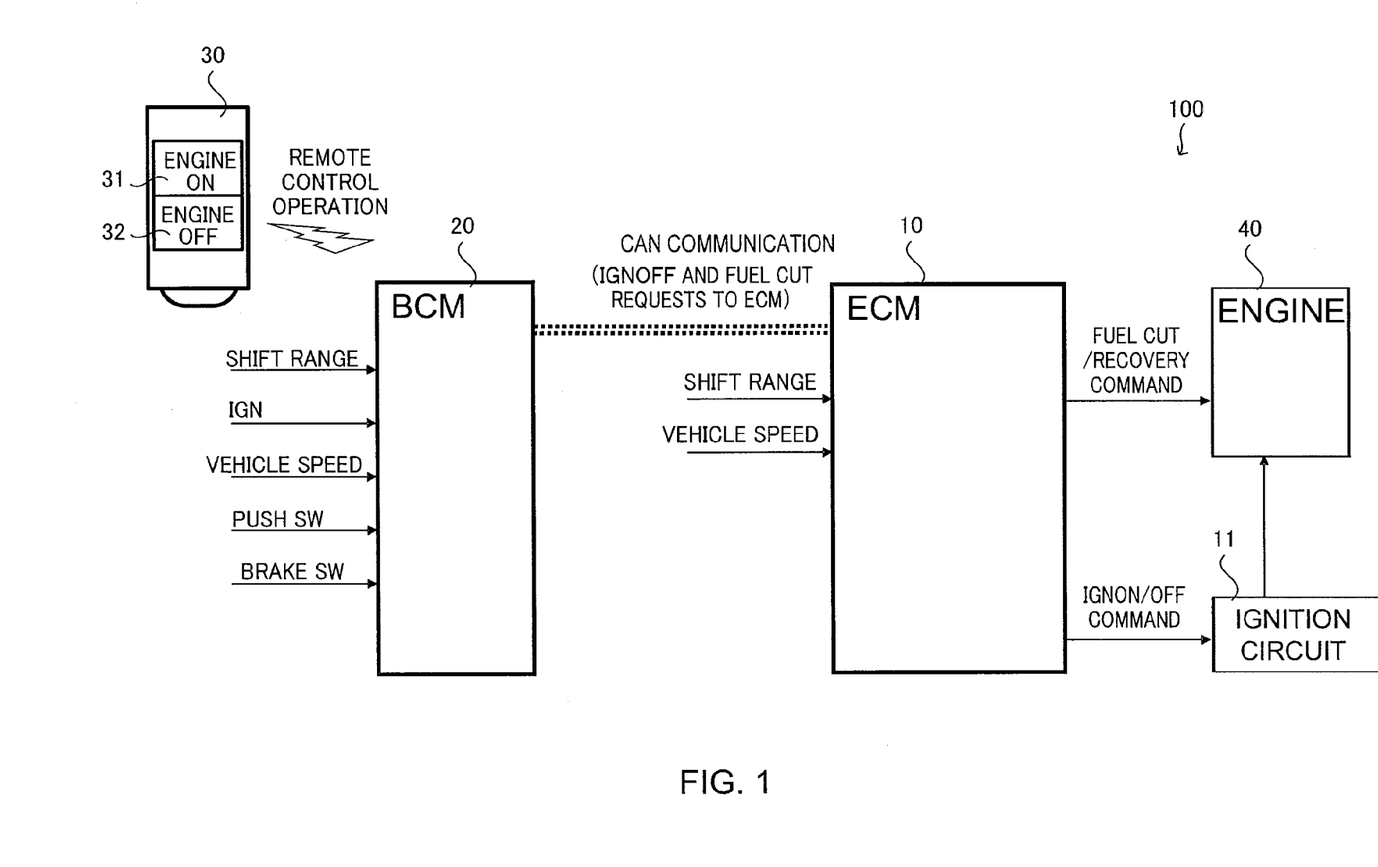
FIG. 1 is a system configuration diagram of a remote control device for vehicle in an embodiment.

FIG. 1 is a system configuration diagram of a remote control device for vehicle 100 in the present embodiment. The remote control device for vehicle 100 includes an engine control module (ECM) 10, a body control module (BCM) 20 and a remote controller 30.

The ECM 10 controls operating states including the start and stop of an engine 40 based on an operation position of a shift lever, a vehicle speed and a signal transmitted from the BCM 20.

The BCM 20 transmits a signal on an engine control to the ECM 10 based on the operating state of the vehicle. The BCM 20 and the ECM 10 are connected to each other by CAN communication which functions as a vehicle-mounted LAN.

The BCM 20 receives the operation position of the shift lever, an ON/OFF state of an ignition switch, the vehicle speed, an ON/OFF state of a push switch which is operated to start the engine 40 by a driver sitting in a vehicle and an ON/OFF state of a brake switch from sensors and the like, and requests the ECM 10 to start and stop the engine 40.

The BCM 20 transmits an IGNON request to the ECM 10 to energize an ignition circuit 11 of the engine 40 in the case of requesting an engine start and transmits an IGNOFF request to the ECM 10 to cut off energization to the ignition circuit 11 of the engine 40 in the case of requesting an engine stop. In the case of requesting an engine stop and in the event of a failure which makes it impossible to cut off a power supply of the vehicle, the BCM 20 transmits a fuel cut request to the ECM 10 to stop fuel supply to the engine 40.

The remote controller 30 is a transmitter unit portable by the driver and transmits a signal to the BCM 20, which functions as a receiver unit, via radio waves or infrared waves in accordance with the operation of the driver. An engine start button 31 and an engine stop button 32 are arranged on an operation unit of the remote controller 30, and a signal is transmitted to the BCM 20 according to the button 31, 32 selected by the driver.

The driver carrying the remote controller 30 can regulate temperature in a vehicle interior to an appropriate temperature by operating the remote controller 30 to remotely start the engine 40 and actuating an air conditioner, which operates in conjunction with the engine 40, immediately before (e.g. 5 minutes before) getting into the vehicle.

The BCM 20 automatically stops the engine 40 to suppress an increase of a fuel consumption amount if a vehicle starting operation is not performed even after the elapse of a predetermined time (e.g. 10 minutes) after the engine is remotely started by the remote controller 30.

However, in the event of a failure which makes it impossible to cut off the power supply of the vehicle, the engine 40 does not stop and an engine operating state continues even if a request to cut off energization to the ignition circuit 11 is transmitted from the BCM 20. The engine operating state similarly continues even if the driver operates the engine stop button 32 using the remote controller 30.

Accordingly, in such a case, the BCM 20 transmits a fuel cut request to the ECM 10 to stop fuel supply to the engine 40. The ECM 10 stops the fuel supply to the engine 40 in response to the fuel cut request received from the BCM 20.

Figure 2:
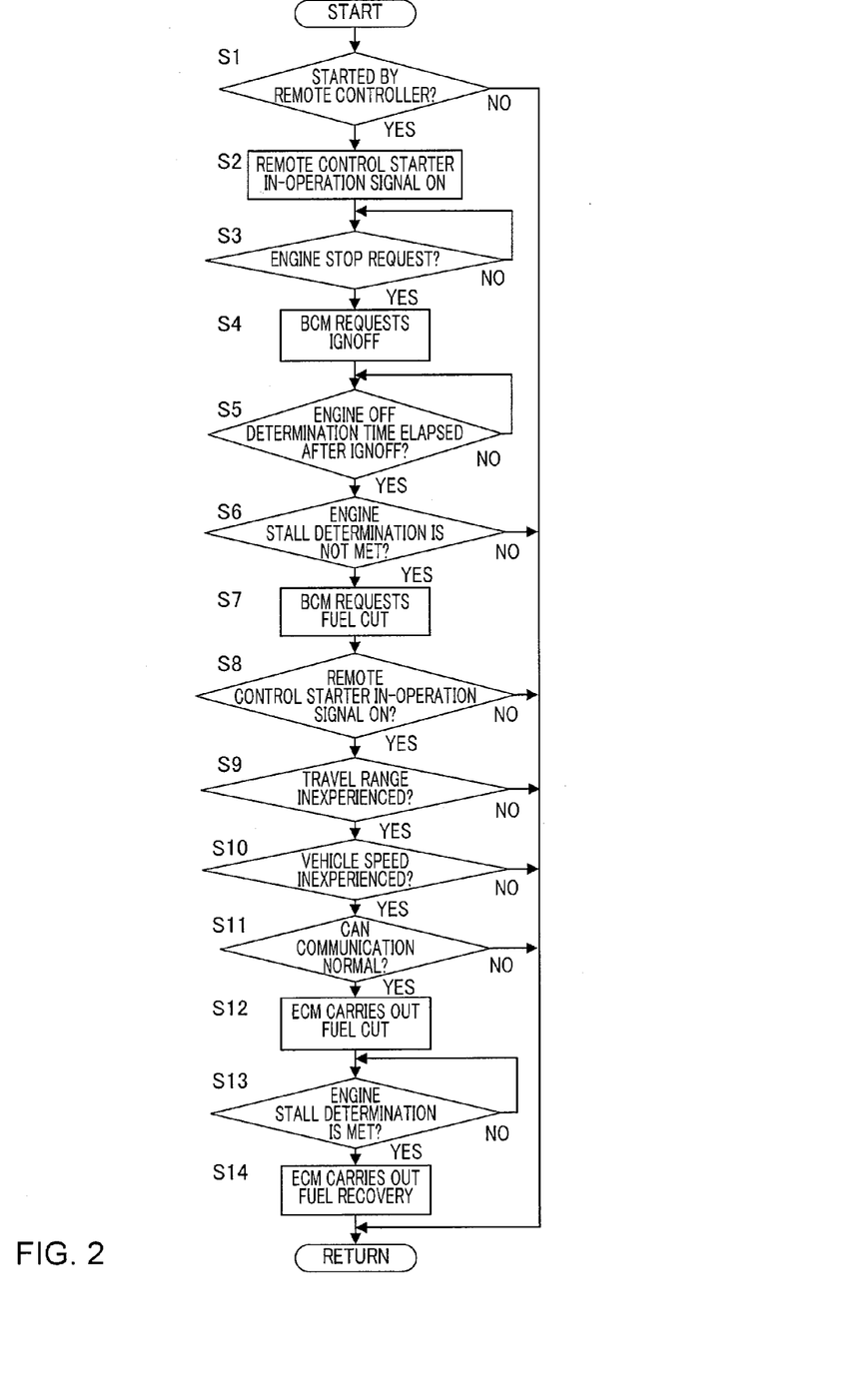
FIG. 2 is a flow chart showing the flow of a control of the remote control device for vehicle in the present embodiment.

A control executed in the BCM 20 and the ECM 10 is described below. FIG. 2 is a flow chart showing the flow of a control process performed in the BCM 20 and the ECM 10.

In Step S1, the BCM 20 determines whether or not the engine start by the remote controller 30 has been made. The engine start by the remote controller 30 is determined and the process proceeds to Step S2 if the driver remotely starts the engine 40 by operating the remote controller 30, whereas the process ends unless such determination is made. For example, if the driver starts the engine 40 by pushing an engine start button (push switch) arranged such as on an instrument panel in the vehicle interior, it is not determined that the engine start by the remote controller 30 has been made.

In Step S2, the BCM 20 switches a remote control starter in-operation signal on. The remote control starter in-operation signal is a signal which indicates that the engine 40 has been started by the remote controller 30 and is set off when the engine 40 stops.

In Step S3, the BCM 20 determines whether or not a request to stop the engine 40 is present. The process proceeds to Step S4 if the presence of the request to stop the engine 40 is determined and returns to Step S3 again unless such determination is made. The presence of the request to stop the engine 40 is determined in the case of satisfying at least one of a condition that the driver has operated the engine stop button 32 of the remote controller 30 and a condition that a predetermined forced OFF time has elapsed after the engine start by the remote controller 30.

The predetermined forced OFF time is a time during which temperature in the vehicle interior can be set to a comfortable temperature by the air conditioner that operates in conjunction with the engine start and which does not allow a useless idling state to be continued, and is, for example, set at 10 minutes.

In Step S4, the BCM 20 transmits an ignition OFF request to the ECM 10. Upon receiving this, the ECM 10 cuts off energization to the ignition circuit 11.

In Step S5, the BCM 20 determines whether or not a predetermined engine OFF determination time has elapsed after the ignition is turned off. The process proceeds to Step S6 if the elapse of the engine OFF determination time is determined and the process returns to Step 5 again unless such determination is made. The engine OFF determination time is set at a time which enables it to be accurately determined that the engine 40 has reached a stalled state after the ignition is turned off, and set, for example, at 10 seconds.

In Step S6, the BCM 20 determines whether or not the engine stall determination is not met. The process proceeds to Step S7 if the engine stall determination is determined not to be met and the process ends unless such determination is made. The engine stall determination (cranking permission) is met when the engine 40 is in the stalled state, e.g. when the rotation speed of the engine 40 is a predetermined low rotation speed or lower.

In Step S7, the BCM 20 transmits a fuel cut request signal for the engine 40 to the ECM 10.

In Step S8, the ECM 10 determines whether or not the remote control starter in-operation signal is on. The process proceeds to Step S9 if the remote control starter in-operation signal is determined to be on, whereas the process ends unless such determination is made.

In Step S9, the ECM 10 determines whether or not a travel range (e.g. D-range, R-range) is inexperienced. The process proceeds to Step S10 if the travel range is determined to be inexperienced, whereas the process ends unless such determination is made. That the travel range is inexperienced means that the travel range has not been set even once after the engine 40 was remotely started by the remote controller 30.

In Step S10, the ECM 10 determines whether or not the vehicle speed is inexperienced. The process proceeds to Step S11 if the vehicle speed is determined to be inexperienced, whereas the process ends unless such determination is made. That the vehicle speed is inexperienced means that the vehicle speed has not been detected even once after the engine 40 was remotely started by the remote controller 30.

In Step S11, the ECM 10 determines whether or not the CAN communication is normal. The process proceeds to Step S12 if the CAN communication is determined to be normal, whereas the process ends unless such determination is made.

In Step S12, the ECM 10 carries out the fuel cut of the engine 40.

In Step S13, the ECM 10 determines whether or not an engine stall determination is met. The process proceeds to Step S14 if the engine stall determination is determined to be met, whereas the process returns to Step S13 again unless such determination is made.

In Step S14, the ECM 10 carries out fuel recovery for the engine 40.

Figure 3:
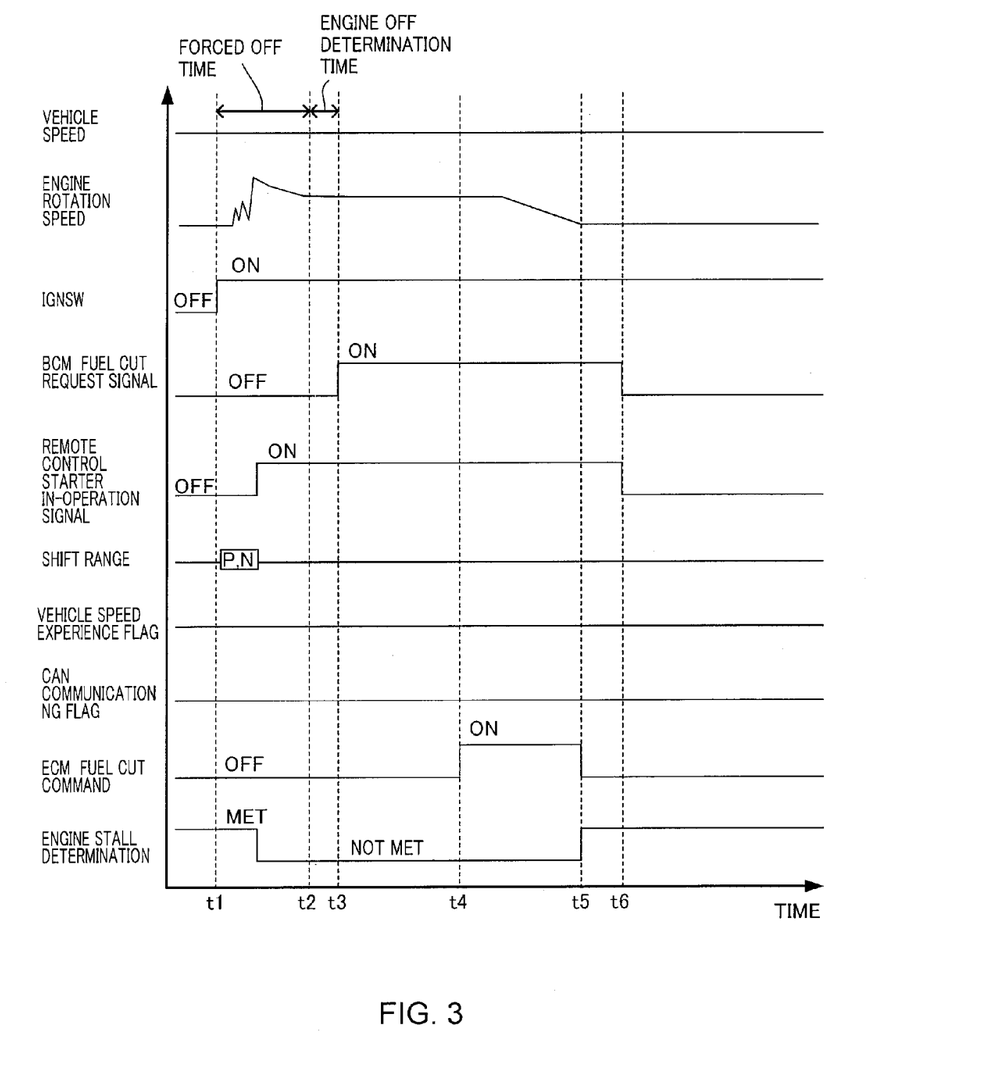
FIG. 3 is a time chart showing an operation of the remote control device for vehicle in the present embodiment.

Next, functions by the above control are described. FIG. 3 is an operation time chart when the control by the BCM 20 and the ECM 10 is executed.

The time chart of FIG. 3 shows a case where the fuel cut is forcibly carried out when the engine 40 does not stop even if the ignition OFF request is given after the engine start by the remote controller 30 and after the elapse of the forced OFF time.

When the driver operates the engine start button 31 of the remote controller 30 for the parked vehicle (time t1), the ignition is turned on by the ECM 10 and the cranking of the engine 40 is started. When an engine starting operation of the engine 40 is completed, the remote control starter in-operation signal is set on and the engine stall determination is no longer met.

When the forced OFF time elapses after the engine start, the BCM 20 transmits an ignition OFF request (time t2). If the engine stall determination is not met until the engine OFF determination time elapses after the ignition OFF request, the BCM 20 transmits a fuel cut request (time t3).

Thereafter, when it is determined that the remote control starter in-operation signal is on, the travel range is inexperienced, the vehicle speed is inexperienced and the CAN communication is normal, the ECM 10 carries out the fuel cut (time t4).

When the engine 40 is forcibly stopped and the engine stall determination is met, the ECM 10 carries out the fuel recovery (time t5). Further, the fuel cut request by the BCM 20 is withdrawn and the remote control starter in-operation signal is set off (time t6).

This can prevent the operation of the engine 40 from being uselessly continued even in the event of a failure which makes it impossible to cut off the power supply of the vehicle.

Figure 4:
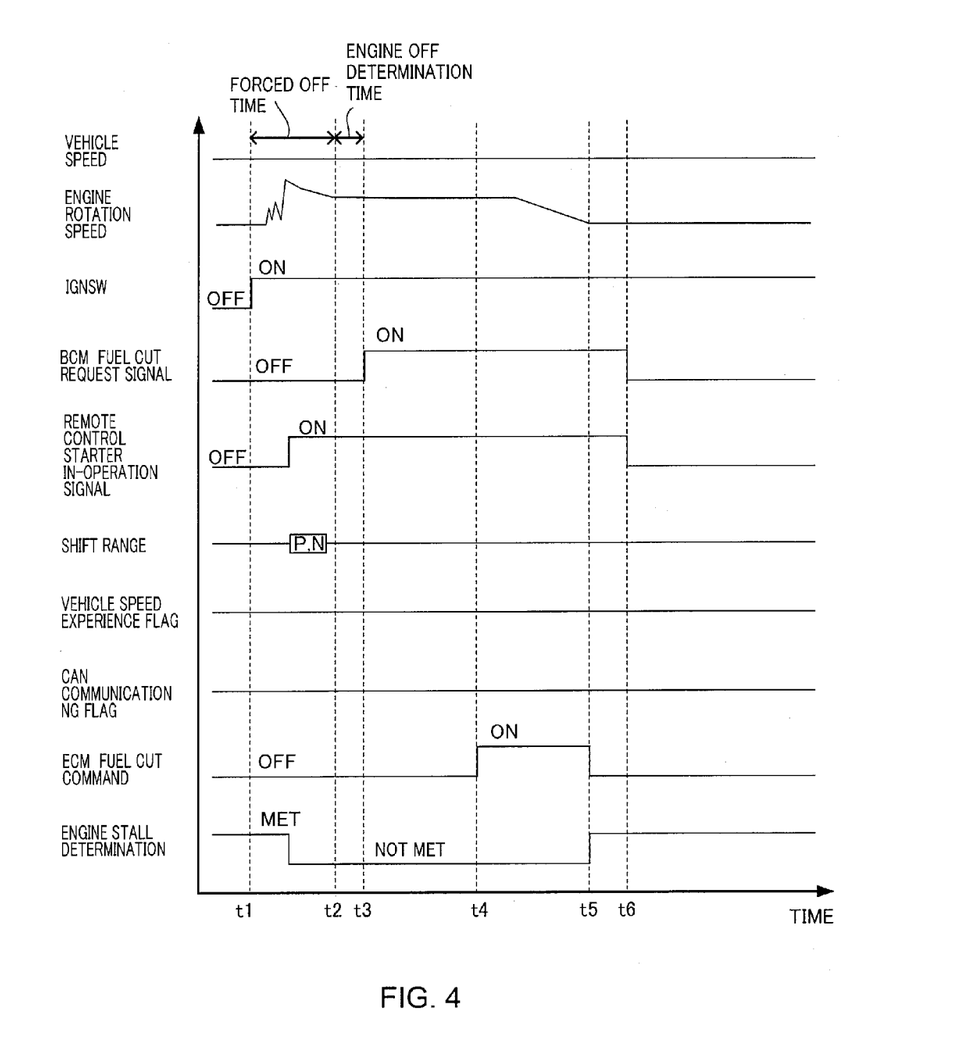
FIG. 4 is a time chart showing an operation of the remote control device for vehicle in the present embodiment.

A time chart of FIG. 4 shows a case where the driver operates the engine stop button 32 of the remote controller 30 after the engine start by the remote controller 30 and before the elapse of the forced OFF time.

When the driver operates the engine start button 31 of the remote controller 30 (time t1), the ignition is turned on by the ECM 10 and the cranking of the engine 40 is started. When the engine starting operation of the engine 40 is completed, the remote control starter in-operation signal is set on and the engine stall determination is no longer met.

Thereafter, when the driver operates the engine stop button 32 of the remote controller 30, the BCM 20 transmits an ignition OFF request (time t2). If the engine stall determination is not met until the engine OFF determination time elapses after the ignition OFF request, the BCM 20 transmits a fuel cut request (time t3).

This can stop the engine 40 in accordance with the driver's request even in the event of a failure which makes it impossible to cut off the power supply of the vehicle.

Figure 5:
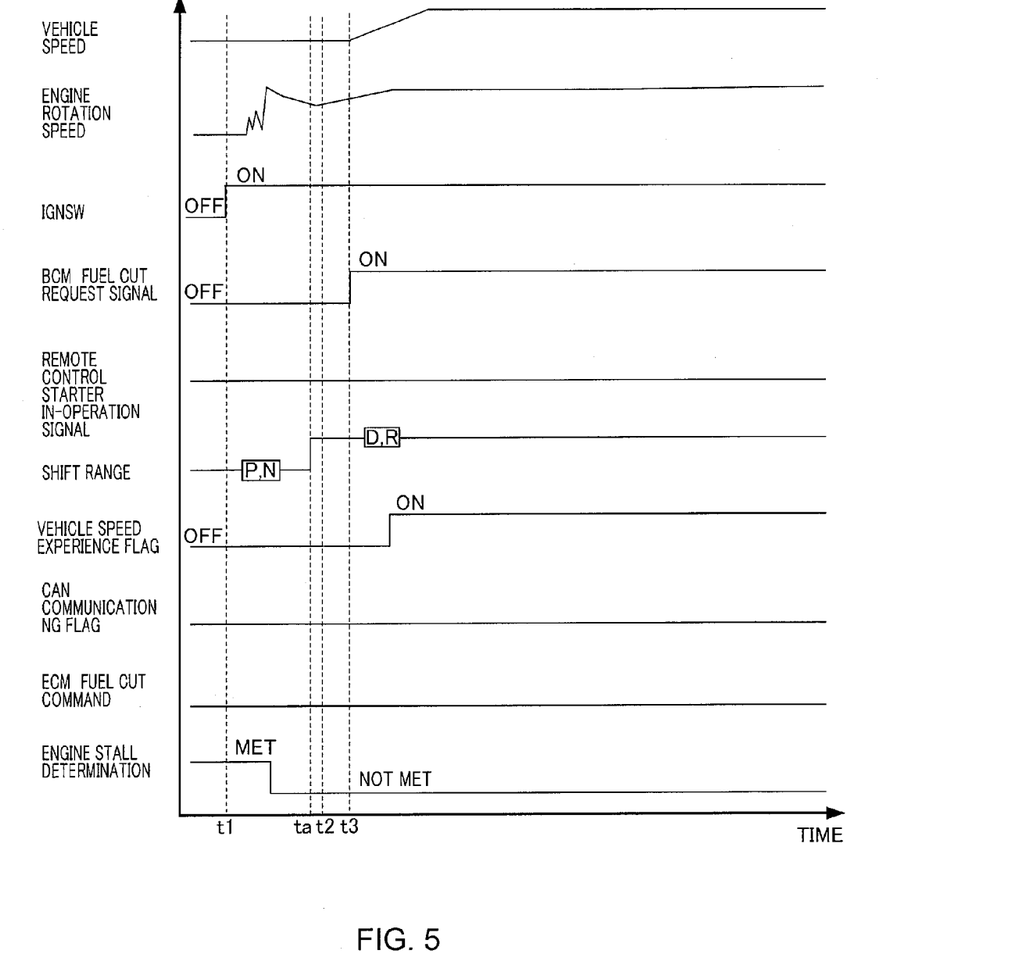
FIG. 5 is a time chart showing an operation of the remote control device for vehicle in the present embodiment.
Figure 6:
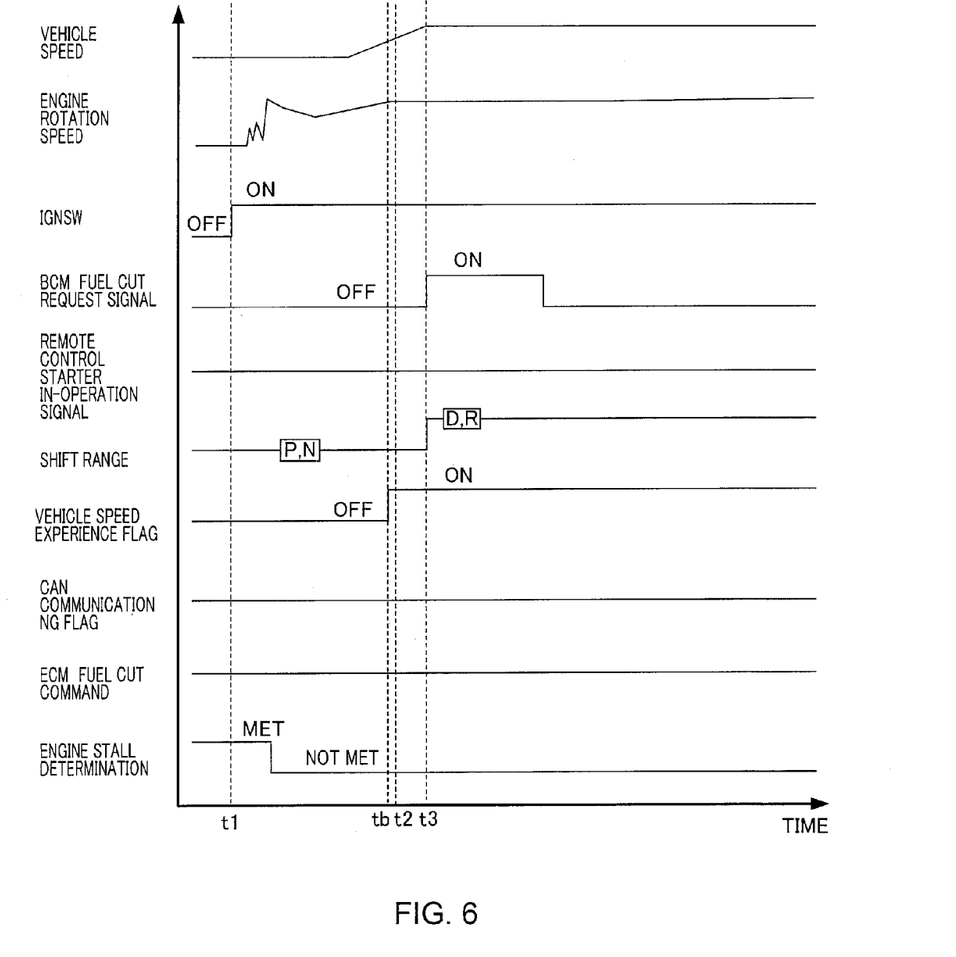
FIG. 6 is a time chart showing an operation of the remote control device for vehicle in the present embodiment.

Time charts of FIGS. 5 and 6 show a case where the ECM 10 does not carry out the fuel cut even if the BCM 20 transmits a fuel cut request.

If a shift range is switched from a non-travel range (P, N) to a travel range (D, R) (time ta) until the BCM 20 transmits the fuel cut request (time t3) after the engine start by the remote controller 30 is made (time t1) as shown in FIG. 5, the ECM 10 does not carry out the fuel cut even if the fuel cut request is transmitted from the BCM 20 thereafter.

If the vehicle speed is experienced (time tb) until the BCM 20 transmits the fuel cut request (time t3) after the engine start by the remote controller 30 is made (time t1) as shown in FIG. 6, the ECM 10 does not carry out the fuel cut even if the fuel cut request is transmitted from the BCM 20 thereafter.

If the shift range is switched or the vehicle speed changes as shown in FIG. 5 or 6, it can be judged that the driver is in the vehicle. Thus, in such a case, it can be prevented that a sense of discomfort is given to the driver by not carrying out the fuel cut.

Figure 7:
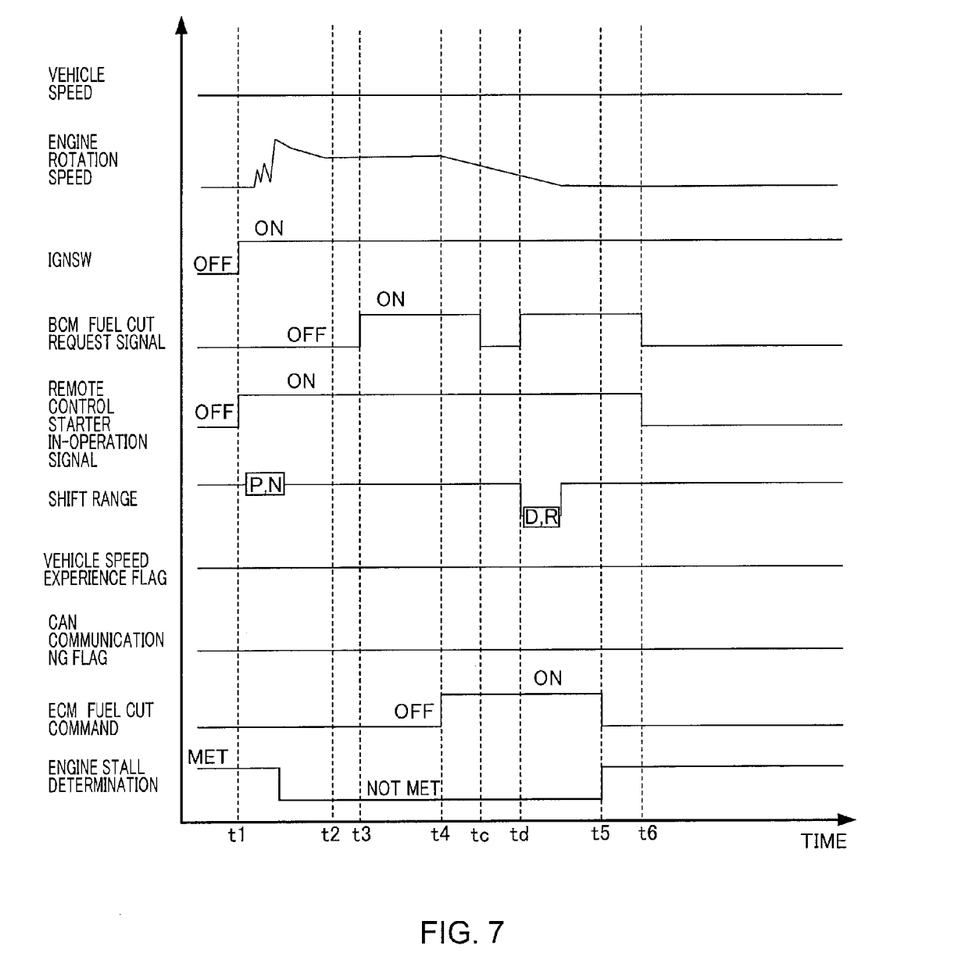
FIG. 7 is a time chart showing an operation of the remote control device for vehicle in the present embodiment.

A time chart of FIG. 7 shows a case where the fuel cut request is canceled by the BCM 20 and the shift range is switched after the fuel cut is carried out.

The fuel cut is continuously carried out when the fuel cut request is canceled by the BCM 20 (time tc) after a fuel cut command is output from the ECM 10 (time t4). This can reliably stop the engine 40 regardless of a condition change after the fuel cut is started.

Further, the fuel cut is continuously carried out also when the shift range is switched to the travel range (D, R) (time td) after the fuel cut command is output from the ECM 10 (time t4).

This can prevent a sudden start of the vehicle due to an increase of a drive force caused by the resumption of the fuel supply in the travel range.

Figure 8:
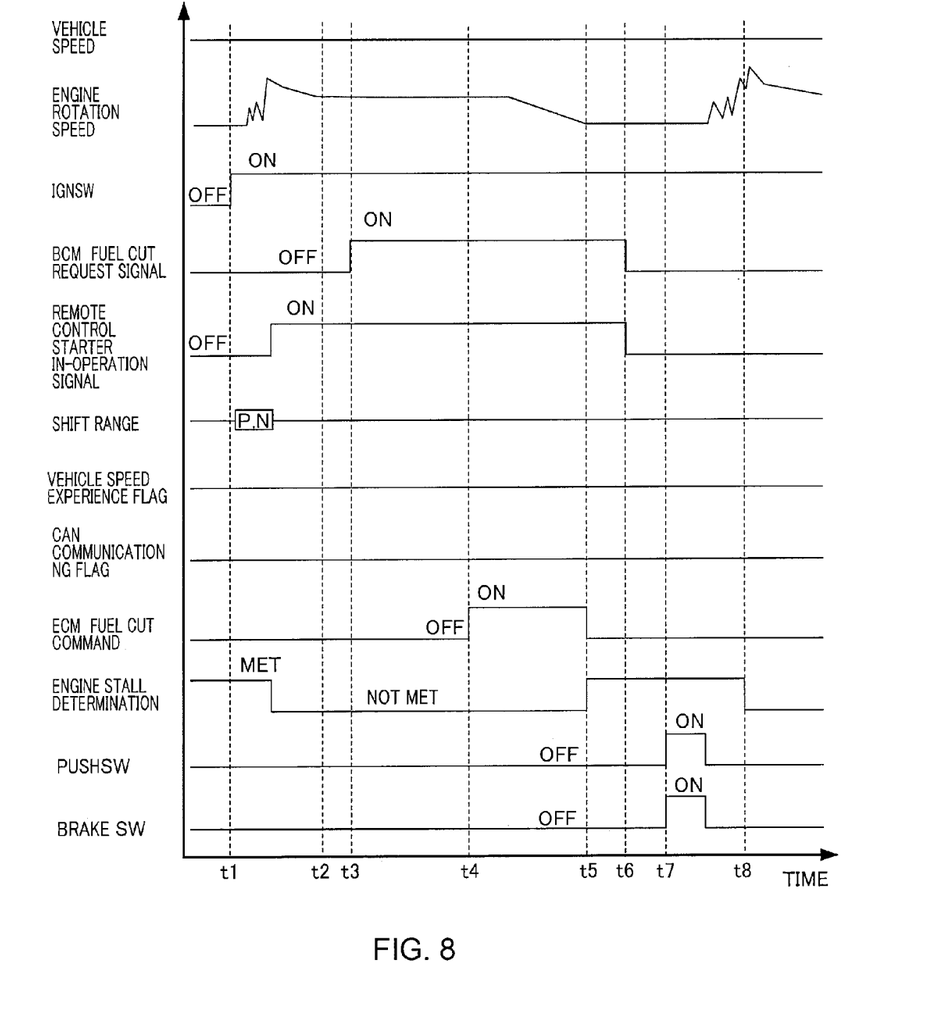
FIG. 8 is a time chart showing an operation of the remote control device for vehicle in the present embodiment.

A time chart of FIG. 8 shows a case where the driver gets into the vehicle and starts the engine 40 after the engine 40 is forcibly stopped by the fuel cut by the ECM 10. This time chart is identical to FIG. 3 up to time t6.

After the engine 40 is stopped by the remote controller 30, the engine 40 is not started even if an engine start operation is performed again using the remote controller 30. When the driver gets into the vehicle and operates an engine start button (push switch) while depressing a brake pedal (time t7), the engine 40 is started. When the engine starting operation is completed, the engine stall determination is no longer met (time t8).

Figure 9:
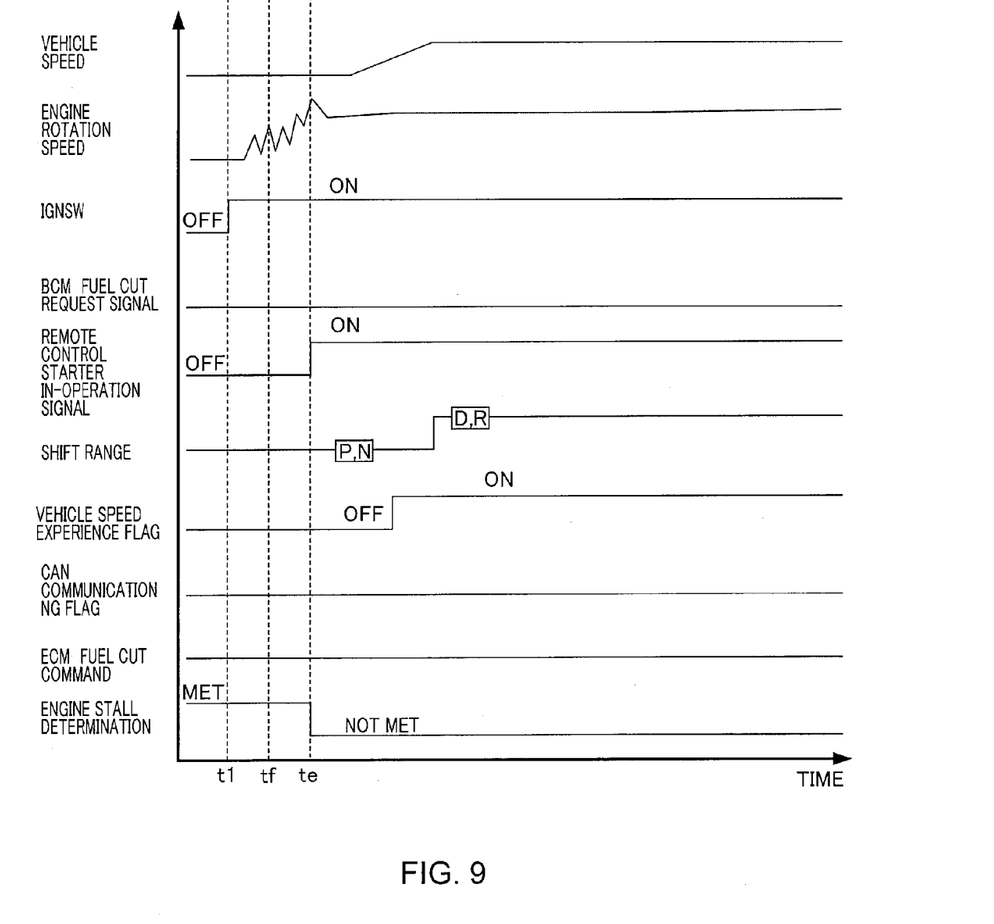
FIG. 9 is a time chart showing an operation of the remote control device for vehicle in the present embodiment.

A time chart of FIG. 9 shows a case where an engine stop operation is performed using the remote controller 30 until the engine starting operation of the engine 40 is completed after the ignition is turned on when the engine is started by the remote controller 30.

When the driver operates the engine start button 31 of the remote controller 30 (time t1), the ignition is turned on by the ECM 10 and the cranking of the engine 40 is started. When the completion of the engine starting operation of the engine 40 is determined, the remote control starter in-operation signal is set on and the engine stall determination is no longer met (time te). If the driver operates the engine stop button 32 (time tf) until the engine starting operation of the engine 40 is completed, the BCM 20 transmits no fuel cut request. Specifically, the engine start is continued without being stopped.

Figure 10:
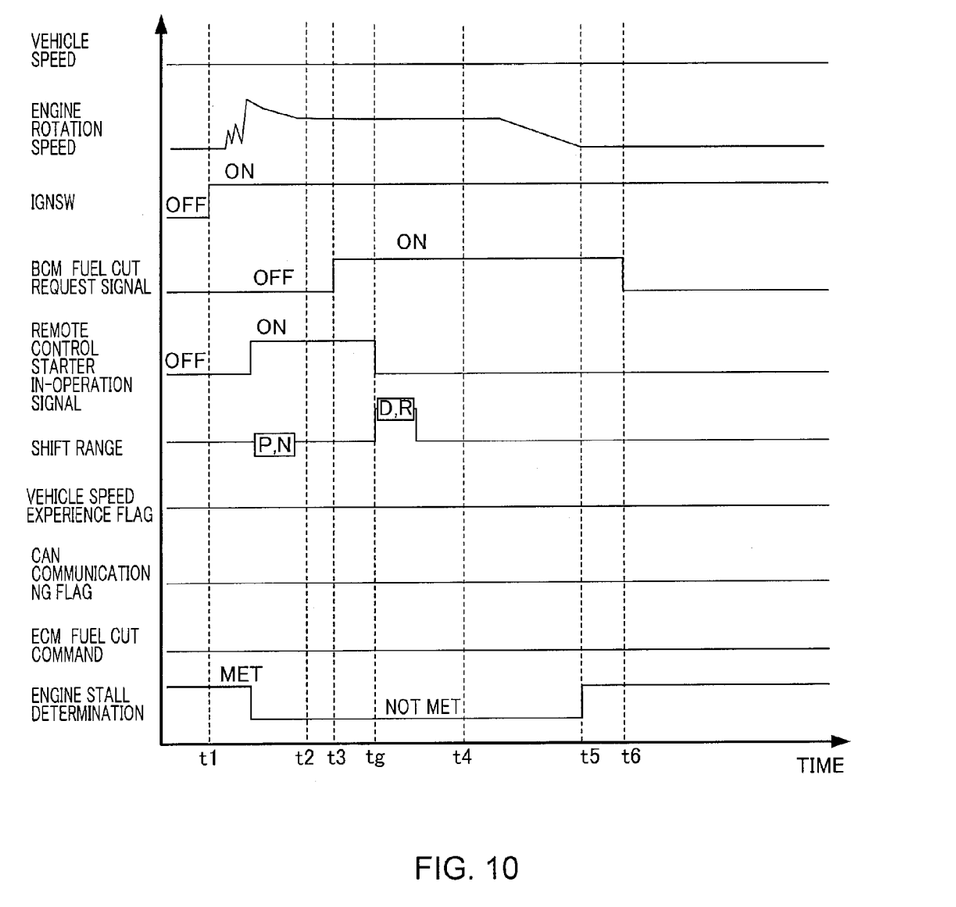
FIG. 10 is a time chart showing an operation of the remote control device for vehicle in the present embodiment.

A time chart of FIG. 10 shows a case where the shift range is switched until the ECM 10 commands the fuel cut after the BCM 20 transmits the fuel cut request.

If the shift range is switched to the travel range (D, R) until the ECM 10 commands the fuel cut (e.g. 1 second) after the BCM 20 transmits the fuel cut request, the remote control starter in-operation signal is set off (time tg) and the ECM 10 outputs no fuel cut command.

This is because an operation by the driver can be determined by detecting the switch of the shift range and it is not necessary to carry out the fuel cut in such a case.

In the present embodiment, the fuel supply to the engine 40 is stopped to stop the engine 40 when the predetermined forced OFF time elapses in an engine start state by the remote controller 30. Further, the fuel supply to the engine 40 is similarly stopped to stop the engine 40 also when an engine stop request is received. This can forcibly stop the engine 40 even in the event of a failure which makes it impossible to cut off the power supply of the vehicle. Thus, it is possible to realize a highly reliable remote control device while suppressing a cost increase.

Further, in stopping the engine 40, the ignition circuit 11 of the engine 40 is first cut off and the fuel supply to the engine 40 is stopped when the engine 40 does not stop even after the elapse of the engine OFF determination time. This can suppress the frequency of stopping the engine 40 in the case of erroneous determination due to a system failure or the like.

Further, the fuel cut is prohibited when the shift range is switched from the non-travel range to the travel range or the vehicle speed is experienced until the BCM 20 transmits the fuel cut request after the engine start by the remote controller 30 is made, and the ECM 10 does not carry out the fuel cut even if the fuel cut request is transmitted from the BCM 20 thereafter. This can prevent an engine stop during driving in the case of erroneous determination due to a system failure or the like.

Furthermore, the fuel cut is continuously carried out until the engine 40 stops if the fuel cut request is canceled by the BCM 20 or the shift range is switched to the travel range immediately after the fuel cut command is output from the ECM 10. This can more reliably stop the engine 40 regardless of a condition change after the fuel cut is started.

Furthermore, the fuel supply is continued without being stopped if the driver operates the engine stop button until the engine starting operation of the engine 40 is completed after the engine start by the remote controller 30 is started. This can more reliably start the engine 40 by preventing the engine stop caused by an erroneously operation of the driver immediately after the engine start is started.

The embodiments of the present invention described above are merely illustration of some application examples of the present invention and not of the nature to limit the technical scope of the present invention to the specific constructions of the above embodiments.

The present application claims a priority based on Japanese Patent Application No. 2011-114605 filed with the Japan Patent Office on May 23, 2011, all the contents of which are hereby incorporated by reference.

The invention claimed is:

1. A remote control device for a vehicle configured to remotely control a start and a stop of an engine mounted in the vehicle, the remote control device comprising:
   a transmission unit configured to transmit a start request and a stop request of the engine; and
   an engine control unit configured to
      cut off an ignition circuit of the engine when, in a state in which the engine is started upon receiving the start request, at least one of the following conditions is satisfied: (1) a predetermined forced OFF time has elapsed, or (2) the stop request has been received,
      determine whether or not a predetermined engine OFF determination time has elapsed after the engine control unit cuts off the ignition circuit, and
      stop fuel supply to the engine when the engine does not stop even after the elapse of a predetermined engine OFF determination time elapses.

2. The remote control device for the vehicle according to claim 1, further comprising a driving state determination unit configured to determine whether or not the vehicle is in a driving state, wherein:
   the engine control unit is further configured to prohibit a stop of the fuel supply to the engine when the vehicle is determined to be in the driving state.

3. The remote control device for the vehicle according to claim 2, wherein:
   the driving state determination unit determines that the vehicle is in the driving state when a shift range of the vehicle is switched from a non-travel range to a travel range.

4. The remote control device for the vehicle according to claim 2, wherein:
   the driving state determination unit determines that the vehicle is in the driving state when a vehicle speed is non-zero.

5. The remote control device for the vehicle according to claim 2, wherein:
   the engine control unit continues to stop the fuel supply to the engine until the engine stops when the vehicle is determined to be in the driving state after the fuel supply to the engine is stopped.

6. The remote control device for the vehicle according to claim 1, wherein:
   when the engine stop request is received, the engine control unit is further configured to prohibit a stop of the fuel supply to the engine until an engine starting operation is completed after the start request is received.

7. A remote control method for remotely controlling a start and a stop of an engine mounted in a vehicle, comprising:
   transmitting a start request or a stop request of the engine;
   in a state in which the engine is started upon receiving the start request, cutting off an ignition circuit of the engine when at least one of the following conditions is satisfied: (1) a predetermined forced OFF time has elapsed, or (2) the stop request has been received;
   determining whether or not a predetermined engine OFF determination time has elapsed after cutting off the ignition circuit; and
   stopping fuel supply to the engine when the engine does not stop even after the predetermined engine OFF determination time elapses.

8. A remote control device for a vehicle configured to remotely control a start and a stop of an engine mounted in the vehicle, comprising:
   a transmission unit configured to transmit a start request and a stop request of the engine;
   an engine control unit configured to
      cut off an ignition circuit of the engine when, in a state in which the engine is started upon receiving the start request, at least one of the following conditions is satisfied: (1) a predetermined forced OFF time has elapsed, or 2) the stop request has been received, and
      stop fuel supply to the engine when the engine does not stop; and
   a driving state determination unit configured to determine whether or not the vehicle is in a driving state,
   wherein the engine control unit prohibits the stop of the fuel supply to the engine when the vehicle is determined to be in the driving state.

* * * * *